US006007136A

United States Patent [19]
Zittwitz et al.

[11] Patent Number: 6,007,136
[45] Date of Patent: Dec. 28, 1999

[54] MODULAR VISOR ATTACHMENT FASTENER

[75] Inventors: Paul von Zittwitz, Macomb Twp.; Jon T. Riley, Waterford; Richard A. Knill, Macomb, all of Mich.

[73] Assignee: Fourslides Inc., Madision Heights, Mich.

[21] Appl. No.: 09/165,391

[22] Filed: Oct. 2, 1998

[51] Int. Cl.⁶ ...................................................... B60J 3/00
[52] U.S. Cl. ...................... 296/97.9; 24/295; 248/222.12
[58] Field of Search .................... 296/97.9; 24/293–295, 24/297; 248/222.12

[56] References Cited

U.S. PATENT DOCUMENTS

| | | | |
|---|---|---|---|
| 1,481,515 | 1/1924 | Kraft | 411/545 |
| 4,715,756 | 12/1987 | Danico et al. | 411/369 |
| 4,913,484 | 4/1990 | Dowd et al. | 296/214 |
| 4,989,911 | 2/1991 | Van Order | 296/97.9 |
| 5,056,853 | 10/1991 | Van Order | 296/97.9 |
| 5,061,005 | 10/1991 | Van Order et al. | 296/979 |
| 5,201,564 | 4/1993 | Price | 296/97.9 |
| 5,662,375 | 9/1997 | Adams et al. | 24/297 |

FOREIGN PATENT DOCUMENTS 4341093   6/1994   Germany ............................... 296/97.9

*Primary Examiner*—Dennis H. Pedder
*Attorney, Agent, or Firm*—Renner, Kenner, Greive, Bobak, Taylor & Weber

[57] ABSTRACT

A modular visor attachment fastener (10) secures a visor mounting bracket (90) to an automobile frame (62) with a headliner (80) disposed therebetween. The fastener (10) includes a plurality of equilaterally disposed mounting latches (30) which are received in slots (74) provided in the frame (62). Each mounting latch includes a tab (36) in juxtaposition to a leg (44) with a fastening aperture (32) disposed therebetween. Each leg (44) is deflectably mounted to the frame (62). Insertion of a pin-type fastener (110) through the bracket (90) and into the fastening aperture (32) deflects a flat portion (50) of the leg (44) to further secure the fastener (10) to the frame (62). The fastener (10) may also be provided with concentrically disposed stand-off ribs (26) to properly position the fastener (10) and re-distribute harmful torque forces.

15 Claims, 5 Drawing Sheets

MODULAR VISOR ATTACHMENT FASTENER

TECHNICAL FIELD

The present invention pertains to a mounting device used to attach a component or multiple components to the roof member or body of a vehicle. More particularly, the present invention relates to a device for attaching a conventional sunvisor to the roof of a vehicle, either attached to, or separate from a headliner.

BACKGROUND ART

There are a number of ways to attach a sunvisor to a roof member in a vehicle. The conventional and widely used method employs the use of screws driven by assembly personnel within the vehicle frame with screw guns. This method of assembly is sometimes referred to as a "layer build." In general, each component of the car roof interior is positioned adjacent each other as the vehicle frame travels down an assembly line. First, an attachment fastener is installed in the vehicle frame, whereupon a headliner is positioned adjacent the frame. Next, the visor mounting bracket is attached by inserting screws or the like through the mounting bracket into the attachment fastener.

The problems associated with this type of operation are well known. This process requires that the operators assembling the sunvisors to the roof of the vehicle be able to position the screw guns at odd angles within the vehicle. Due to the odd assembly angles coupled with the fact that the operator must physically hold the visor in place while driving the screws, and go into and out of the vehicle multiple times, ultimate operator fatigue ensues and headliners may be readily subject to damage. Such is not only costly, but also raises the ergonomic issues with respect to the wear and tear on an operator's body which is an area of concern within the automotive industry.

Thus, a "modular build" process of assembly that minimizes or eliminates the operator from physically entering the vehicle to attach components to the vehicle structure, particularly one which minimizes or eliminates the assembly personnel from entering the vehicle with a screw gun once soft trim is attached, is far preferable from an ergonomic, a cost, and an efficiency of manufacturing perspective. In this method, the attachment fastener, headliner and visor mounting bracket are attached to one another in a specially designed fixture. This completed assembly is then inserter into the vehicle frame and secured thereto with minimal application of force. Unfortunately, this method currently requires up to 40 pounds of force to ensure installation and may require the use of rubber mallets to do so. Of course, these mallets may inadvertently damage the headliner.

Many attempts have been made in the past to employ a modular assembly for attaching the sunvisor system directly to the vehicle headliner or installing the system independently of the headliner to the vehicle roof. At least two known directions have been taken, one employing polymeric devices and the other employing the use of steel fasteners. With respect to these two directions, each has been employed with varying levels of success.

With respect to the polymeric device, it can either employ a modular assembly mounted directly to the vehicle headliner or one which is installed independently of the headliner to the vehicle roof. The modular assembly is constructed with the headliner compressed between a visor mounting bracket that is visible from within the vehicle and a polymeric attaching device that rests on the opposite non-visible side of the headliner. This securely holds the visor to the headliner through a compressive force. This system is then installed into the vehicle as one complete overhead assembly with respect to, but not limited to, the sunvisors. The sunvisor, which may be installed independently of the headliner to the vehicle roof in a non-modular assembly, is usually but not always the same type of polymeric material that is employed in the device to mount the visor to the vehicle roof. In order for this system to function, the polymeric material is required to be under a constant state of preload after installation in order to hold the visor securely to the sheet metal roof throughout the operating life of the vehicle. However, over a length of time, the polymeric device, while under a state of preload, tends to creep and the visor loosens noticeably with respect to the attachment to the sheet metal within the vehicle. Customer use of the visor accelerates this condition by subjecting the polymeric attaching device to cyclic loading, thus stressing the visor assembly and in particular the polymeric attaching device. Another concern is that a bur, created during the forming and blanking of the sheet metal attaching aperture in the roof or roof member support structure may be present. Such a bur may cut, scribe or etch a line in the polymeric attaching device. As a result, a fatigue line develops during cyclic loading of the visor causing the polymeric mounting device to fatigue, loosen, and/or fail prematurely, i.e., before the end of the expected life of the vehicle.

The second type of mounting system is a steel fastening device. This system is employed in the assembly much like the polymeric attaching device, and is subject to the same assembly processes as the polymeric device. The benefits of the steel type fastening system is its ability to withstand long term pre-load as well as the ability to withstand greater loads, especially those which are encountered during cyclic loading of the sunvisor with no noticeable loss of retention. The steel fastening system has the ability to accommodate a wider range of sheet metal variance as well as retain the structural integrity of the mounting system when subject to a bur condition in the roof member aperture. However, during assembly of the visors to the vehicles, this mounting system requires a great deal of force to install the system in the vehicle frame due to the configuration of the mounting system. Furthermore, this mounting system is unable to accommodate an allowable variance in sheet metal thickness coupled with an allowable bur condition with respect to assembly. Also, under these and similar conditions, it is often unclear whether or not all surfaces of the fastening device are properly engaged and mounted to a mounting surface in the vehicle roof aperture because the mounting system gives no audible feedback to assembly personnel. Other drawbacks of the device arise during visor use within the vehicle. A majority of the mounting systems in use locate the engagement surfaces of the visor mounting bracket in close proximity to the center line on the visor elbow rod, thus concentrating the forces that are applied to the mounting system across a small area proximate to the engagement surfaces of the mounting system. This allows movement of the mounting system and as a direct result, there is visible perceptible movement of the polymeric visor mounting bracket with respect to the mounting system as well as perceptible deflection of the headliner system proximate and adjacent to the polymeric sunvisor mounting bracket which is an undesirable condition.

DISCLOSURE OF THE INVENTION

It is thus an object of the present invention to provide a modular visor attachment fastener for attaching a visor to an automobile frame.

It is another object of the present invention to provide an attachment fastener, as above, which includes a base with a mount surface opposite a roof surface with a tower aperture therethrough.

It is a further object of the present invention to provide an attachment fastener, as above, in which a plurality of concentrically positioned stand-off ribs extending in either direction from the base are disposed about the tower aperture.

It is yet another object of the present invention to provide an attachment fastener, as above, in which a plurality of mounting latches extend from the roof surface to engage the automobile frame.

It is still a further object of the present invention to provide an attachment fastener, as above, in which each mounting latch is proximally positioned near a fastening aperture which extends through the base, wherein each fastening aperture has a fastening aperture center line.

It is an additional object of the present invention to provide an attachment fastener, as above, in which each mounting latch has a tab in juxtaposition to a leg wherein a pin-type fastener is insertable through the fastening aperture such that the tab and the leg Each engage at least a portion of the pin-type fastener.

It is yet an additional object of the present invention to provide an attachment fastener, as above, in which the leg angularly extends from the roof surface and provides a flat portion which is substantially parallel to the fastening aperture center line and wherein the flat portion further extends to a ramp such that the leg is temporarily deflected as it is inserted into the automobile frame and then returns to an installed position once completely inserted into the frame.

It is still an additional object of the present invention to provide an attachment fastener, as above, in which insertion of the pin-type fastener braces the mounting latch.

It is still another object of the present invention to provide an attachment fastener, as above, in which the attachment fastener is positioned in a fixture, whereupon a headliner substrate and a visor mounting bracket are attached thereto and the completed sub-assembly is then attached to an automobile frame.

It is another object of the present invention to provide an attachment fastener inserted into the automobile frame, in the alternative, in which a headliner substrate is positioned adjacent the automobile frame and the modular visor attachment fastener such that a visor mounting bracket may be aligned therewith and which allows receipt of pin-type fasteners through the fastening apertures of the attachment fastener so as to secure the visor mounting bracket to the frame.

It is yet another object of the present invention to provide an attachment fastener, as above, which includes concentrically disposed stand-off ribs about the base of the modular visor attachment fastener such that the stand-off dimension conforms to a particular automobile frame and/or visor bracket and also wherein the stand-off ribs are concentrically disposed about the base to further distribute torquing forces applied by the pin-type fasteners away from the center of the attachment fastener.

These and other objects of the present invention, as well as the advantages thereof over existing prior art forms, which will become apparent from the description to follow, are accomplished by the improvements hereinafter described and claimed.

In general, a modular visor attachment fastener for attaching a visor to an automobile frame made in accordance with the present invention includes a base having a roof surface opposite a mount surface, the base having a plurality of fastening apertures extending therethrough. A like plurality of mounting latches extend from the roof surface wherein each mounting latch is proximally positioned and associated with each fastening aperture. Each mounting latch has a tab in juxtaposition to a leg. Accordingly, when a pin-type fastener is inserted into the fastening aperture to secure a visor and the modular visor attachment fastener to a headliner and/or the automobile frame, the tab and the leg each engage at least a portion of the inserted pin-type fastener.

In accordance with another aspect of the invention, a modular visor device may be provided with concentrically disposed ribs about a base such that any torquing force applied by a pin-type fastener is distributed to the outer periphery of the base and away from its center. It will also be appreciated that the concentric ribs may be disposed in the direction of a roof surface or a mount surface provided by the base depending upon the automobile frame and/or the visor mounting bracket to be interconnected therewith.

In accordance with yet another aspect of the invention a combination of a modular visor attachment fastener, a substrate and a visor mounting bracket is provided. The substrate includes an aperture therethrough. The visor mounting bracket, which carries a visor, has a plurality of bracket apertures therethrough. The modular visor attachment fastener has a plurality of mounting latches, each of which includes a tab in juxtaposition with a leg. The mounting latches are received in the substrate aperture. A pin-type fastener is then received through the fastening aperture and bracket aperture to engage the tab and the leg.

A preferred modular visor attachment fastener incorporating the concepts of the present invention is shown by way of example in the accompanying drawings without attempting to show all the various forms and modifications in which the invention might be embodied. The invention being measured by the appended claims and not by the details of the specification.

PREFERRED EMBODIMENT FOR CARRYING OUT THE INVENTION

Figure 1:
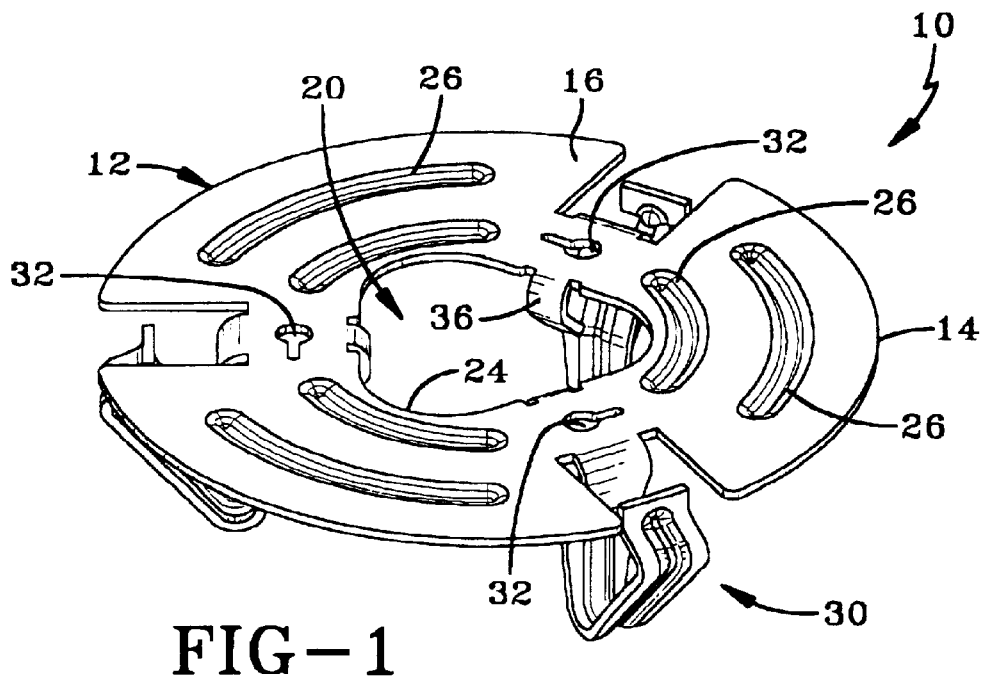
FIG. 1 is a bottom perspective view of a modular visor attachment fastener made in accordance with the present invention.
Figure 2:
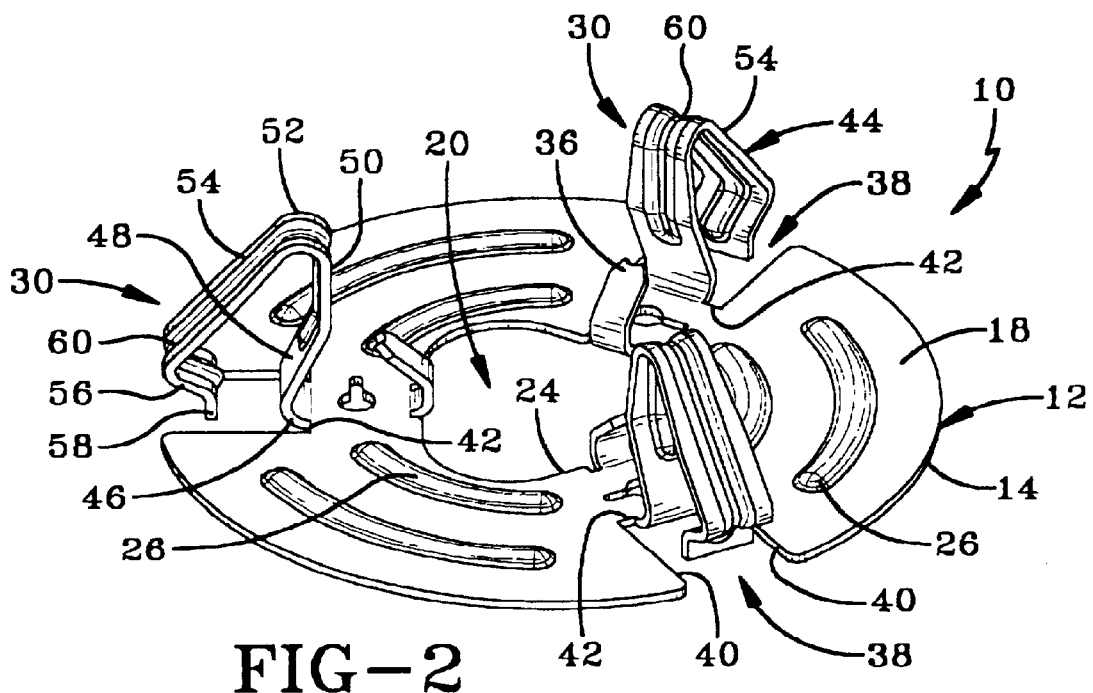
FIG. 2 is a top perspective view of the attachment fastener.

A modular visor attachment fastener made in accordance with the concepts of the present invention is indicated generally by the numeral 10 in the accompanying drawings and is preferably made of a suitable steel material with spring-like properties. Fastener 10 includes a base, generally indicated by the numeral 12, which has an outer periphery 14 and a mount surface 16 opposite a roof surface 18, as seen in FIGS. 1 and 2. Extending through base 12 is a tower aperture 20, which in the preferred embodiment is of a non-circular shape. As shown in FIGS. 1 and 2, tower aperture 20 is substantially an equilateral triangle with radiused vertices. Accordingly, tower aperture 20 is provided with an inner edge periphery 24.

A plurality of stand-off ribs 26 extend from the base 12 concentrically about tower aperture 20. Stand-off ribs 26 may extend from either mount surface 16 or roof surface 18 and provide additional strength to base 12. Other benefits of stand-off ribs 26 will be hereinafter described.

Figure 3:
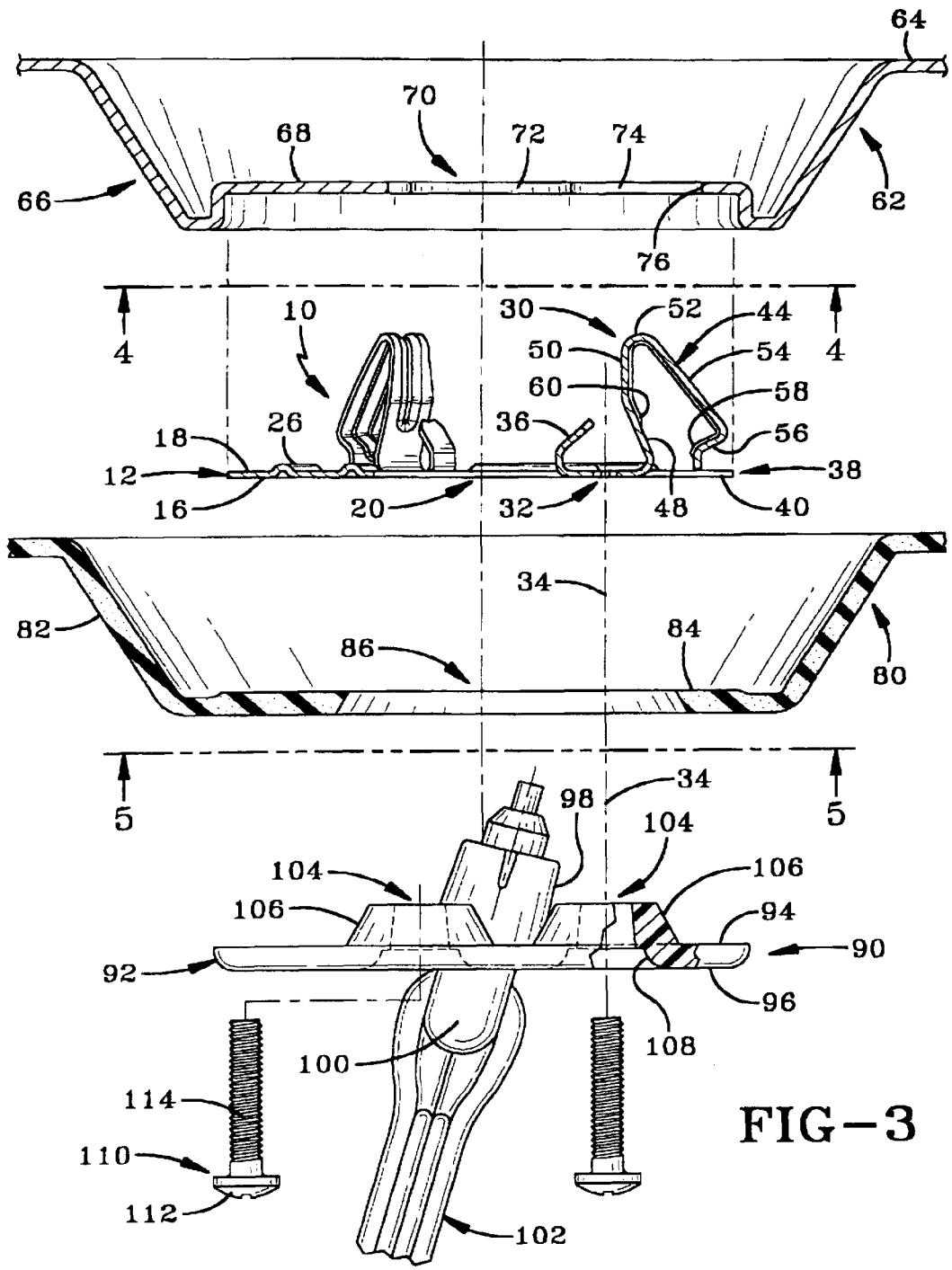
FIG. 3 is an exploded view showing the attachment fastener as it will be assembled to an automobile frame and a visor mounting bracket.

A plurality of mounting latches, each generally indicated by the numeral 30, are shown equidistantly positioned about the periphery of base 12. Each mounting latch 30 has associated therewith a fastening aperture 32 extending through base 12 for receiving a fastener. The fastening aperture 32 may incorporate a single helix thread or it may be a smooth bore, depending upon the type of fastener received therein. Each aperture 32 has associated therewith an aperture centerline 34 (FIG. 3). Each mounting latch 30 includes a tab 36 that angularly extends from roof surface 18 and inner periphery 24 toward centerline 34. As best seen in FIG. 3, the end of tab 36 extends into a cylindrical area defined by aperture 32 yet does not intersect aperture centerline 34. Each mounting latch 30 also includes a notch 38 formed inwardly of outer periphery 14. Each notch 38 is diametrically opposite each tab 36 with respect to thread aperture 32. Each notch 38 is formed with opposed sides 40 which are interconnected by an end 42.

Each mounting latch 30 also includes a leg, generally indicated by the numeral 44, which extends angularly from end 42 in an upward direction from roof surface 18. Leg 44 includes a leg base 46 which extends from end 42 toward outer periphery 14. A bar 48 angularly extends from leg base 46 toward centerline 34. A flat portion 50 extends upwardly from bar 48 and is positioned to be substantially parallel with centerline 34. Flat portion 50 terminates at an apex 52 such that leg 44 is redirected angularly downwardly toward outer periphery 14 in the form of a ramp 54. As shown, ramp 54 does not extend past outer periphery 14; however, if required by the overall assembly, ramp 54 may extend past outer periphery 14. A lip 56 is directed angularly inwardly from ramp 54 toward inner periphery 24. A stub 58 extends downwardly from lip 56 and is substantially perpendicular to base 12. Stub 58 does not typically extend through notch 38. A bead 60 may extend the length of leg 44 from bar 48 to stub 58 to provide additional strength to leg 44.

Figure 4:
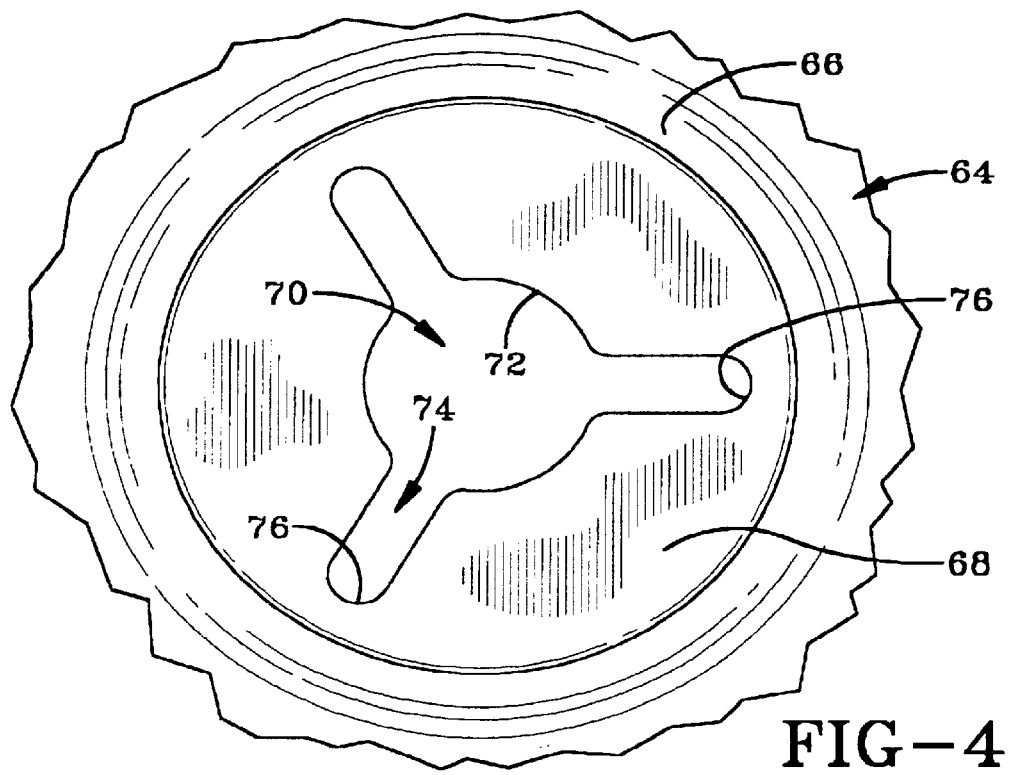
FIG. 4 is a fragmented plan view of the automobile frame prior to receiving the modular visor attachment fastener.
Figure 5:
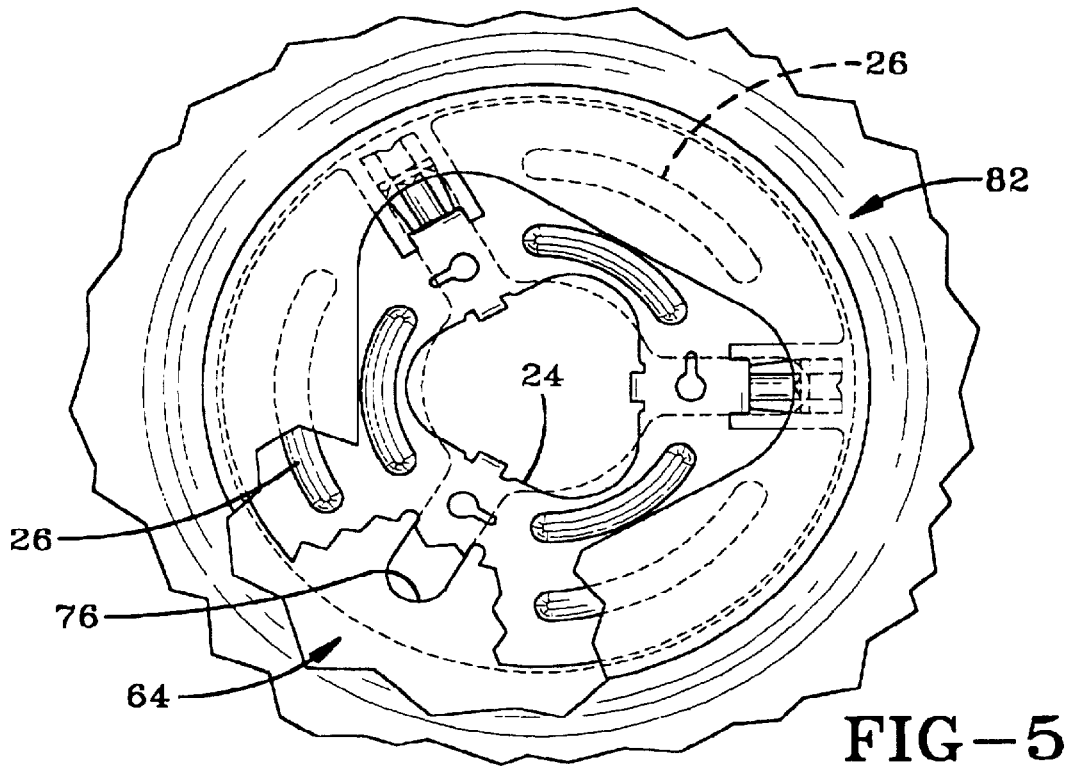
FIG. 5 is a partially fragmented plan view of the modular visor attachment fastener received between the automobile frame and the headliner substrate.
Figure 6:
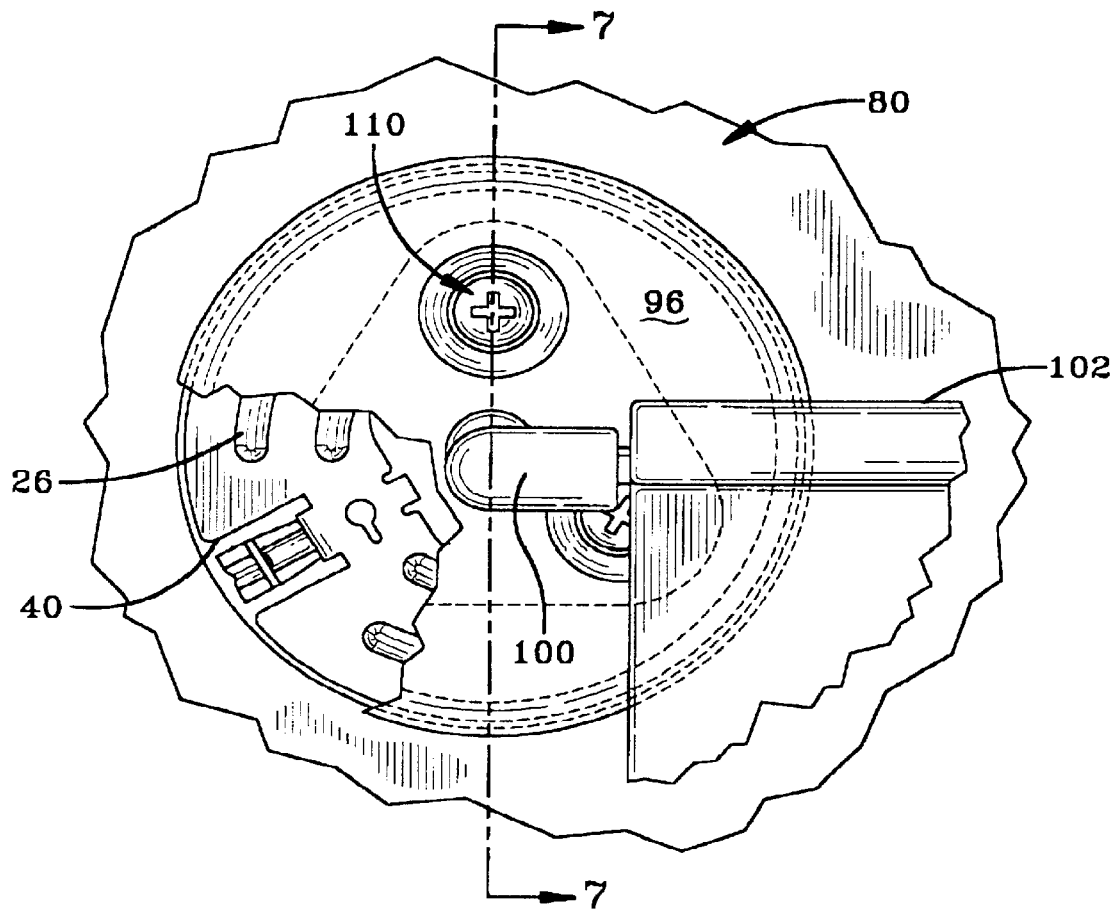
FIG. 6 is a partially fragmented plan view of the visor mounting bracket attached to the headliner substrate and the modular visor attachment fastener.

In either a "modular build" or a "layer build," wherein a modular build is preferred, fastener 10 is assembled to an automobile frame which is designated generally by the numeral 62. In particular, automobile frame 62 includes a pillar or header 64 which has an integrally formed frusto-conical member generally designated by the numeral 66. An inset collar 68 extends from member 66 toward the upper surface or roof of the automobile and has a mounting aperture 70 extending therethrough. It will be appreciated that inset collar 68 may be flush or extend outwardly from member 66. In fact, header 64 may itself be flush and not provided with member 66. As best seen in FIG. 4, mounting aperture 70 has a major opening edge 72 which is substantially circular in shape. Extending equilaterally from major opening edge 72 are radially extending slots 74, each having a slot end 76.

Referring back to FIG. 3, in a layer build, fastener 10 is inserted into mounting aperture 70. In particular, each leg 44 is inserted into a corresponding slot 74. As fastener 10 is inserted into collar 68, each ramp 54 engages and bears against a corresponding slot end 76. As such, each slot end 76 partially deflects each leg 44 until such time that ramp 54 is diametrically reduced in size to allow fastener 10 to be coupled to frame 62. Accordingly, as ramp 54 clears slot end 76, leg 44 re-expands to an installed condition and lip 56 is then supported by a top surface of inset collar 68. Insertion of fastener 10 into mounting aperture 70 will provide an audible noise as stub 58 contacts slot: end 76 to confirm a complete seating of fastener 10 in header 64. Stub 58 remains adjacent and bears against slot end 76. Once installed using either build method, optimal engagement between fastener 10 and frame 62 is attained by lip 56 being seated on or adjacent to slot end 76.

After fastener 10 is seated in header 64 in a layer build, a headliner/substrate 80 is positioned adjacent fastener 10 and header 64. Substrate 80 includes a frusto-conical portion 82 sized to fit over frusto-conical member 66. Of course, portion 82 is formed to conform with the shape of member 66 and/or header 64. A mount collar 84 is formed within frusto-conical portion 82 and is at least adjacent to mount surface 16 when completely assembled. Substrate 80 includes an aperture 86 sized to allow through access to fastening apertures 32. It will also be appreciated that aperture 86, which may be tapered as shown or not, is concentrically aligned with tower aperture 20 and mounting aperture 70.

A visor mounting bracket, generally indicated by the numeral 90, includes a base 92 having a substrate surface 94 opposite a visor surface 96. A tower 98 extends through base 92 and is fixed with respect to visor mounting bracket 90. An elbow rod 100 extends from tower 98 and is rotatably movable within tower 98. A visor 102 is carried by elbow rod 100 in a manner well known in the art. Extending through base 92 are a plurality of bracket apertures 104 which are aligned with fastening apertures 32. Each bracket aperture 104 is surrounded by a tapered boss 106 which bears against mount surface 16 when mounting bracket 90 is completely assembled to fastener 10. Each bracket aperture 104 is provided with a counter bore 108.

Figure 7:
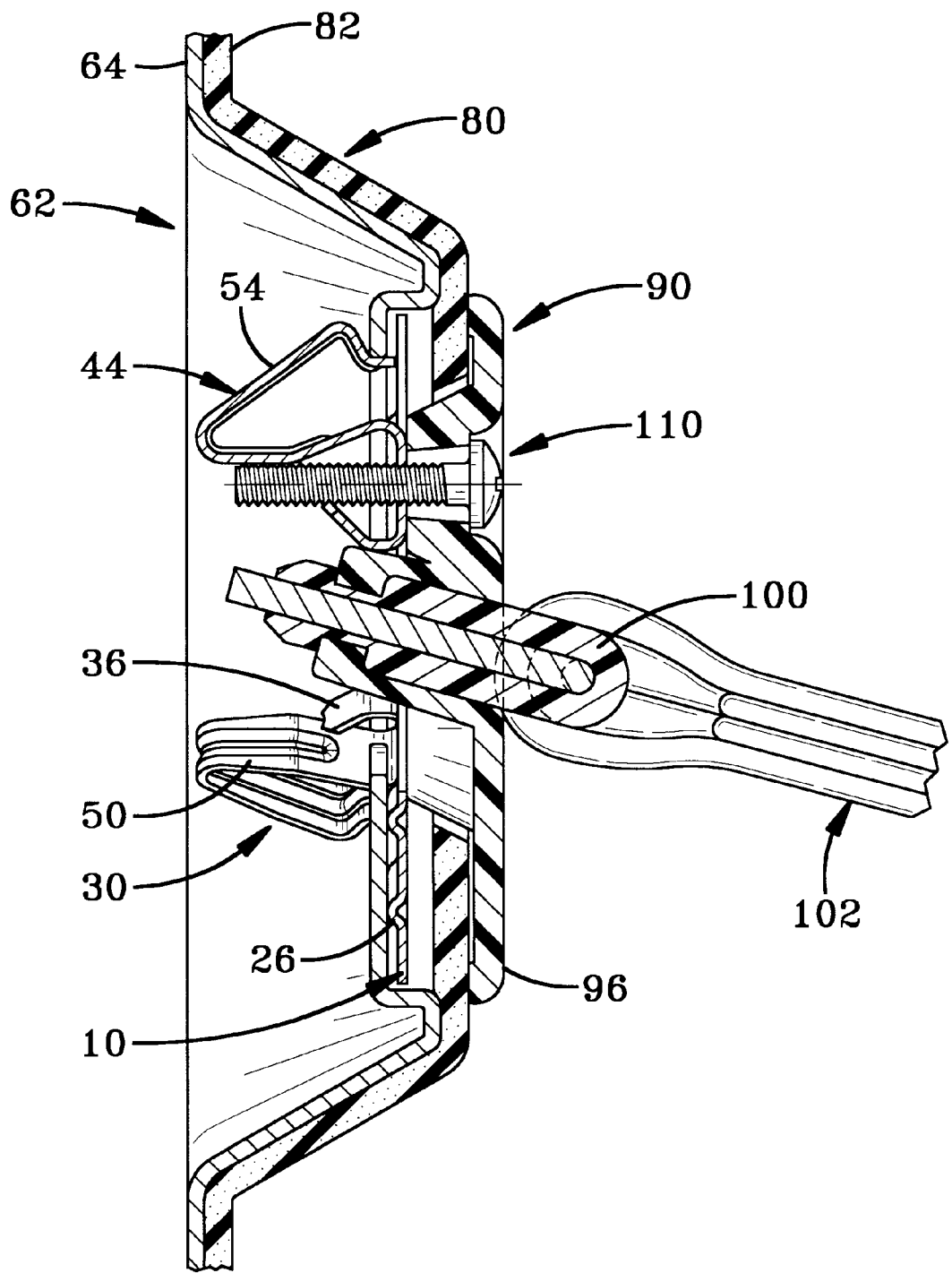
FIG. 7 is a sectional view of the modular visor attachment fastener interconnecting the visor mounting bracket to the automobile frame.

In the layer build, fastener 10 is snapped into position within header 62 and substrate 80 is positioned thereover, an operator will position visor mounting bracket 90 such that tower 98 extends into tower aperture 20 and mounting aperture 70, as well as aperture 86. Likewise, bracket apertures 104 are aligned with, and share centerline 34 with, fastening apertures 32. The operator will then insert a pin-type fastener 110, which in the preferred embodiment is threaded, through bracket aperture 104 and fastening aperture 32. Each pin 110 includes a head 112 and a shaft 114. As shaft 114 extends through fastening aperture 32, a portion thereof is engaged by tab 36 and flat portion 50. It will be appreciated that flat portion 50 and tab 36 are sized so as to frictionally engage shaft 114. As such, any torque force applied to fastener 10, through visor mounting bracket 90, is absorbed by stand-off ribs 26 to redistribute forces from the center of fastener 10 to its outer periphery when installed and under load. Additionally, shaft 114 engages flat portion 50 to slightly deflect leg 44. In turn, lip 56 exerts a downward tightening force upon the top surface of inset collar 68, as best seen in FIG. 7, to further enhance their optimal engagement. It will be further appreciated that tab 36 and flat portion 50 provide somewhat limited engagement of shaft 114. Accordingly, a low-insertion-force is experienced by the operator when inserting the pin 110 to secure visor mounting bracket 90. Pin-type fasteners, other than threaded fasteners, could be employed. The primary requirement of the pin 110 is that it engages tab 36 and flat portion 50 and is not easily withdrawn with a mere axial application of force once installed.

Implementation of the attachment fastener 10 in the preferred modular build requires the placement of fastener 10 in an appropriate fixture. Headliner/substrate 80 and visor mounting bracket 90 are attached to fastener 10 in much the same manner as described above. This completed sub-assembly interior is then installed in the automobile frame. Each latch assembly 30 is slightly deflected when installed and provides the desired audible noise to indicate its proper seating in the automobile frame. It will be appreciated that tab 36 functions to support inserted fastener 110 as fastener 10 is installed and during loading. This maintains the structural integrity of the ramp and of course, the completed assembly.

Based upon the foregoing, the advantages of the above-described modular visor attachment fastener 10 are readily apparent. A primary advantage of the fastener 10 is that it can be easily sized to fit adjacent any automobile frame. Inner periphery 20 may be sized so as to accept most commercially available visor mounting brackets 90. Still another advantage c)f the present invention is that by equilaterally disposing the mounting latches 30, the fastener 10 is easily inserted into a standard sized opening provided by the automobile frame. By employing a ramped surface on each mounting latch 30, the fastener 10 can be inserted by hand or with an appropriate driving force of 10 pounds or less in either a modular or layer build. Still yet another advantage of the present invention is that the stand-off ribs 26 may be directed from either mount surface 16 or roof surface 18 to adjust for particular design parameters of the automobile frame, the substrate header and/or the visor mounting bracket to allow for a secure fit between the interconnected components. Additionally, the stand-off ribs 26 are concentrically positioned about the periphery of the base such that as the fasteners 110 apply a torque force through the fastener 10, these forces are redistributed from the interior of the fastener 10 to the exterior thereof. As noted previously, failures of the visor mounting bracket generally occur in the center of the device as this is where the most stress is applied as an individual moves the visor from one position to another. Still yet another advantage of the present invention is that the tab 36 and flat portion 50 act as braces when any application of a torque force is applied thereto. This further assists in the re-distribution of forces to the concentric ribs.

In view of the foregoing, it should thus be evident that a modular visor attachment fastener constructed as described herein accomplishes the objects of the present invention and otherwise improves the art.

What is claimed is:

1. A modular visor attachment fastener for attaching a visor to an automobile frame with a rectilingar pin-type fastener, comprising a base having a roof surface, said base having a plurality of fastening apertures therethrough; and a like plurality of tabs and legs extending from said roof surface, each said tab and leg proximal to a corresponding fastening aperture, each said tab being in juxtaposition with a corresponding leg, wherein said pin-type fastener is insertable through said fastening aperture such that each said tab and each said leg engage at least a portion of said pin-type fastener.

2. A fastener according to claim 1 further comprising at least one rib concentrically disposed and extending from said base.

3. A fastener according to claim 1 wherein each said leg has a flat portion which is disposed substantially parallel with a center line of said corresponding fastening aperture.

4. A fastener according to claim 3 wherein each said leg has a ramp extending angularly from said flat portion, wherein each said leg is movable with respect to said base such that each said ramp deflects each said leg when inserted into the automobile frame.

5. A fastener according to claim 1 wherein said leg is deflected by insertion of said pin-type fastener to secure the modular visor attachment fastener to the automobile frame.

6. In combination, a modular visor attachment fastener, a substrate and a visor mounting bracket, the substrate having an aperture therethrough; said visor mounting bracket carrying a visor, said visor mounting bracket having a plurality of bracket apertures therethrough; and said modular visor attachment fastener having a plurality of tabs in juxtaposition with corresponding legs, and a fastening aperture extending through said modular visor attachment fastener between each said tab and each said leg, each said plurality of bracket apertures being alignable with said fastening apertures such that a pin is receivable therethrough to engage said tab and said leg and secure said visor mounting bracket, said substrate and said modular visor attachment fastener to one another in a sub-assembly for later installation in an automobile frame.

7. A combination according to claim 6 wherein said leg includes a ramp, said ramp extends into a lip.

8. A combination according to claim 6 wherein said leg includes a flat portion engaged upon insertion of the pin, wherein engagement of said leg further stabilizes the modular attachment visor to the substrate.

9. A combination according to claim 8 wherein said tab and said leg engage an upper portion of said pin upon insertion thereof.

10. A combination according to claim 6 wherein the modular visor attachment fastener includes a substantially flat base having a plurality of concentrically disposed stand-off ribs extending therefrom.

11. A combination according to claim 6 wherein the modular visor attachment fastener has a tower aperture therethrough and wherein said visor mounting bracket has a tower for carrying a visor, said tower received through said tower aperture.

12. A combination according to claim 6 wherein each said leg has a bead extending substantially the length thereof.

13. A modular visor attachment device for attaching a visor to an automobile frame with a fastener, comprising a base having a roof surface opposite a mount surface; a plurality of associated tabs and legs disposed about the periphery of said base, said base having at least one rib concentrically disposed and extending from one of said roof surface and said mount surface, wherein each said tab and leg is engaged by a rectilingar pin, wherein each said tab is in juxtaposition to said leg with an aperture extending through said base therebetween, wherein the pin is receivable through each aperture and partially engaged by said tab and said leg.

14. A device according to claim 13, wherein each leg has an angularly extending ramp which is deflected as inserted into the automobile frame.

15. A device according to claim 14 wherein each leg has a flat portion engaged by the pin so as to further secure said leg to the automobile frame after insertion of the device into the automobile frame.

* * * * *